United States Patent [19]
Nagel

[11] Patent Number: 5,404,195
[45] Date of Patent: Apr. 4, 1995

[54] APPARATUS FOR ADVANCING, GUIDING AND LOCATING WEBS OF PHOTOSENSITIVE MATERIAL USING GAS DISCHARGING PORTS

[75] Inventor: Erich Nagel, Anzing, Germany

[73] Assignee: Agfa-Gebaert Aktiengesellschaft, Leverkusen, Germany

[21] Appl. No.: 942,412

[22] Filed: Sep. 9, 1992

[30] Foreign Application Priority Data

Sep. 13, 1991 [DE] Germany .................. 41 30 564.7

[51] Int. Cl.⁶ ............................................. G03B 27/62
[52] U.S. Cl. .................................. 355/76; 271/90; 355/202; 355/308
[58] Field of Search ............... 355/308, 309, 311, 316, 355/317, 202, 72, 73, 75, 76; 271/90, 91, 92, 93, 94, 95, 97

[56] References Cited

U.S. PATENT DOCUMENTS

| | | | |
|---|---|---|---|
| 4,089,603 | 5/1978 | Jacobs | 355/73 |
| 4,176,947 | 12/1979 | Spence-Bate et al. | 355/53 |
| 4,257,695 | 3/1981 | Langworthy | 353/95 |
| 4,692,083 | 9/1987 | LeRoux et al. | 271/97 X |
| 4,697,912 | 10/1987 | Sato et al. | 355/202 |
| 4,957,283 | 9/1990 | Kist | 271/90 |
| 5,018,717 | 5/1991 | Sadwick et al. | 271/207 |
| 5,050,853 | 9/1991 | LaVos et al. | 271/98 |
| 5,088,713 | 2/1992 | Hayashi | 271/3.1 |
| 5,111,241 | 5/1992 | Kralles | 355/75 |

FOREIGN PATENT DOCUMENTS 499014 11/1926 Germany .
2932878 2/1980 Germany .
3715689 11/1988 Germany .

*Primary Examiner*—Leo P. Picard
*Assistant Examiner*—Christopher Horgan
*Attorney, Agent, or Firm*—Darby & Darby

[57] ABSTRACT

An exposed and developed photographic film is moved through a copying machine between a fixedly mounted lower guide member and an upper guide member which is movable up and down away from and toward the lower guide member. The confronting surfaces of the guide members have raised portions which surround registering windows of the guide members and engage a film all the way around a film frame which is aligned with the windows when the film is brought to a halt. Once the imaging of the frame which is aligned with the windows is completed, several springs lift the upper guide member, and ports in the raised portions of the confronting surfaces discharge jets of compressed air which cause the film to levitate between the two guide members during advancement of the next film frame to a position of alignment with the windows. This reduces the likelihood of scratching of and/or other damage to the film during transport. The ports can receive compressed air without interruption or only while the upper guide member is lifted above and away from the lower guide member.

11 Claims, 1 Drawing Sheet

APPARATUS FOR ADVANCING, GUIDING AND LOCATING WEBS OF PHOTOSENSITIVE MATERIAL USING GAS DISCHARGING PORTS

BACKGROUND OF THE INVENTION

The invention relates to improvements in apparatus for advancing, guiding and locating webs of photosensitive material, particularly for manipulating webs or strips of exposed and developed photographic films in copying machines wherein the frames of such films are imaged onto photographic paper or the like.

Photographic copying machines employ a so-called negative platform which guides an exposed and developed photographic film and further serves to properly locate a film frame in the course of the copying operation. It is important to maintain a film frame at the copying station in such position that the entire frame is flat because any portion of the frame at such station which is permitted to move out of the plane of the major portion of the frame will produce a blurred (unsharp) portion of the corresponding image on photographic paper or other suitable image receiving material. In order to ensure that the frame which is about to be imaged remains flat, many copying machines are equipped with hold down or clamping devices serving to engage, clamp and locate that portion of a film which surrounds the frame at the copying station, i.e., with devices which engage, clamp and locate the film at all four sides of a square or rectangular frame at the copying station. To this end, the copying machine employs two plate-like guide members, called masks, which define a path for successive exposed and developed films and have registering windows for that film frame which is to be imaged onto photographic paper. In order to prevent the masks from damaging (e.g., scratching) the film during intermittent transport to move the next frame into register with the windows of the masks, presently known copying machines employ devices which can be operated to move the two masks away from each other upon completion of each imaging operation. This is intended to reduce the likelihood of damage to exposed and developed films, especially by those portions of the masks which engage, clamp and locate film frames along the frame lines between neighboring frames, i.e., in regions extending at right angles to the direction of stepwise or intermittent advancement of a film through the copying station. The extent of movability of the masks away from each other is normally selected in such a way that the retracted masks are out of contact with the film before the film is set in motion in order to advance the next frame to a position of register with the two windows.

In many instances, one of the masks is located below the other mask. The need for movability of the lower mask creates many problems in certain types of copying machines, especially in those which are utilized in so-called minilabs, because the space beneath the path for the film across the copying station is at a premium. The lower mask is located between the film path and the so-called positive platform which supports and guides photographic paper for movement past the copying station.

OBJECTS OF THE INVENTION

An object of the invention is to provide a simple, compact and inexpensive apparatus for advancing, guiding and locating webs of photosensitive material.

Another object of the invention is to provide an apparatus which can be utilized with advantage in minilabs.

A further object of the invention is to provide an apparatus wherein the lower guide member can remain stationary during each and every stage of manipulation of successive webs of photosensitive material in a copying machine.

An additional object of the invention is to provide novel and improved guide members for use in the above outlined web advancing, guiding and locating apparatus.

Still another object of the invention is to provide the above outlined apparatus with novel and improved means for preventing a web from contacting the adjacent parts during transport of successive portions of the web into register with the copying station.

A further object of the invention is to provide a copying machine which embodies the above outlined apparatus.

An additional object of the invention is to provide a web guiding, advancing and locating apparatus which can be installed in existing copying machines, including those utilized in minilabs, as a superior substitute for heretofore known apparatus.

Another object of the invention is to provide the apparatus with novel and improved means for limiting the movability of the guide members or masks relative to each other.

Still another object of the invention is to provide an apparatus whose operation can be automated to any desired extent.

A further object of the invention is to provide an apparatus which can treat the webs of photosensitive material gently and whose operation remains unchanged for long intervals of time.

An additional object of the invention is to provide an apparatus wherein the parts are subjected to a minimum of wear.

Another object of the invention is to provide a novel and improved fluid-operated system for avoiding scratching of and/or other damage to exposed and developed photographic films in a copying machine.

Still another object of the invention is to provide an apparatus which can maintain successive selected portions of an intermittently advanced web of photographic material in a predetermined plane just as reliably as heretofore known apparatus.

SUMMARY OF THE INVENTION

The invention is embodied in an apparatus for guiding and locating webs of photosensitive material which are advanced in a predetermined direction, particularly for guiding and locating webs of exposed and developed photosensitive material in a copying machine. The improved apparatus comprises overlapping first and second guide members (at least one of these guide members can include or constitute a plate) having confronting first and second surfaces which define a path for webs of photosensitive material. The guide members further have registering windows and their surfaces have portions which surround the respective windows. At least one of these portions has gas discharging ports with outlets facing the other portion, and the apparatus further comprises means for moving one of the guide members relative to the other guide member to and from a clamping or locating position in which a web in the aforementioned path is clamped between the two confronting surfaces, and means for admitting a gaseous fluid into the ports, at least while the one guide member is out of the clamping or locating position.

The at least one portion includes at least one section which extends substantially transversely of the path for the webs, and the ports are provided at least in such at least one section of the at least one portion.

At least one of the first and second surfaces can be provided with a recessed zone which is adjacent the aforementioned portion of the at least one surface. The guide member which is provided with the at least one surface can include a platform which surrounds the respective window, and the portion of the at least one surface is preferably provided on such platform.

In accordance with a presently preferred embodiment, the portions of both surfaces have gas discharging ports which are oriented in such a way that the outlets of ports in the portion of the first surface face the second surface and the outlets of ports in the portion of the second surface face the first surface.

The one (movable) guide member is or can be located at a level above the other guide member.

The admitting means can include means for admitting a gaseous fluid into the ports in each position of the one guide member. For example, the admitting means can comprise a continuously driven pump. In accordance with a presently preferred embodiment, the admitting means includes an air compressor and means for connecting the compressor with the ports only when the one guide member is out of the clamping or locating position. The apparatus comprises means, e.g., one or more toothed sprocket wheels which can enter perforations in the marginal portions of a web constituting an exposed and developed photographic film, for advancing a web in the predetermined direction only when the one guide member is out of the clamping or locating position.

The means for moving the one guide member can comprise at least one magnet.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
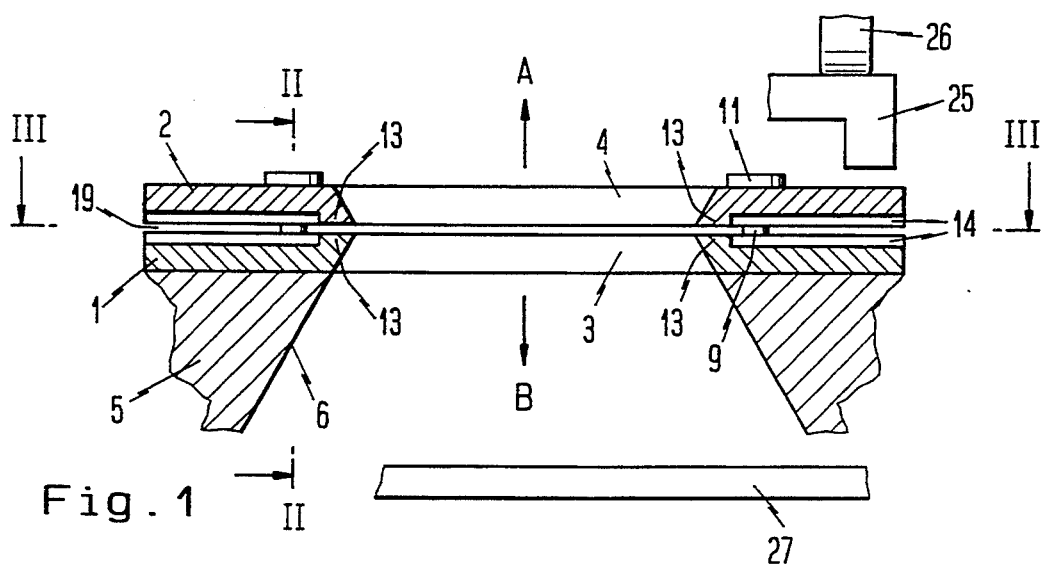
FIG. 1 is a longitudinal vertical sectional view of a portion of a copying machine and of an apparatus which embodies one form of the invention.

The drawing shows an apparatus which can be utilized to advance, guide and locate successive frames 21 of an elongated exposed and developed photographic film 20 at the copying station of a copying machine having a base plate 5 provided with a light duct 6 in register with the windows 3, 4 of two plate-like frame members or masks 1 and 2. A radiation source (not shown) is located at a level above the upper guide member 2, and the radiation which passes through the window 4 and thereupon through a film frame 21, window 3 and duct 6 impinges upon the aligned portion of a strip of photographic paper (not shown) at the upper side of a positive platform 27 beneath the base plate 5.

In accordance with a feature of the invention, the lower guide member 1 is fixedly secured to the base plate 5 while the upper guide member 2 is movable in directions which are indicated by arrows A and B, namely to and from a locating or clamping position which is shown in FIG. 1 and in which the confronting surfaces 1a, 2a of the guide members 1, 2 are spaced apart from each other a distance corresponding to the thickness of the film 20. This ensures that the film frame 21 which then registers with the windows 3, 4 is maintained in a predetermined plane and hence in an optimum position for imaging onto photographic paper on the positive platform 27.

Figure 2:
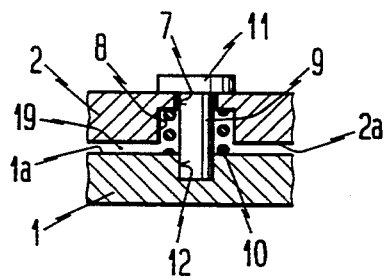
FIG. 2 is a somewhat enlarged fragmentary vertical sectional view of one of several devices which serve to movably couple the guide members of the improved apparatus to each other, the section being taken in the direction of arrows from line II—II of FIG. 1.

The means for movably coupling the upper frame member 2 to the lower frame member 1 comprises four coupling units one of which is illustrated in detail in FIG. 2. This coupling unit comprises a fastener having an externally threaded shank 9 extending into the tapped blind bore or hole 12 of the guide member 1, and a head 11 which overlies the smaller-diameter upper portion 7 of a through hole or bore in the guide member 2. The larger-diameter lower portion 8 of the through bore or hole in the guide member 2 receives the major portion of the shank 9 as well as the major portion of a stressed coil spring 10. The latter tends to expand and to thus maintain the upper side of the guide member 2 in abutment with the head 11 in order to establish a clearance or gap 19 which is bounded by the confronting surfaces 1a, 2a of the guide members 1, 2 and has a variable width including a maximum width greater than the thickness of the film 20. The four coupling units are adjacent the path of movement of the film 20 between the surfaces 1a, 2a of the guide members 1, 2, one at each of the four corners of the registering windows 3 and 4.

The surface 1a of the fixedly mounted frame member 1 comprises a frame-like rectangular portion which is provided on a slightly raised platform of the guide member 1 and includes two parallel sections 14 which extend in parallelism with the direction (arrow D) of intermittent advancement of the film 20, and two sections 13 which extend transversely of such direction and are overlapped by the respective frame lines 23 of the film 20 when a selected frame 21 is maintained in a position of alignment with the windows 3, 4 and light duct 6. The transversely extending sections 13 of the rectangular frame-like portion of the surface 1a are adjacent recessed portions or zones 15, 16 of the surface 1a. The sections 13 are coplanar with the sections 14.

The surface 2a of the reciprocable upper frame member 2 is a mirror image of the surface 1a.

In accordance with a feature of the invention, each section 13 is provided with at least one row of ports 17 having outlets facing the surface 2a, and each section 13 of the surface 2a has at least one row of similar ports with outlets facing the surface 1a.

The ports 17 on the surface sections 13 of the guide member 1, as well as the ports 17 on the surface sections 13 of the guide member 2, are connected to the outlet of an air pump or compressor 18, at least when the upper frame member 2 is moved to the raised position of FIG. 2 to thus establish a relatively wide clearance or gap 19. The arrangement is preferably such that the means for admitting a gaseous fluid (normally air) to the ports 17 of the surfaces 1a and 2a further comprises a suitable regulator or control unit 18a which connects the pump or compressor 18 with the ports 17 only when the guide member 2 is lifted above and away from the clamping or locating position of FIG. 1 (in which the width of the clearance 19 is reduced so that it matches the thickness of the film 20).

Figure 3:
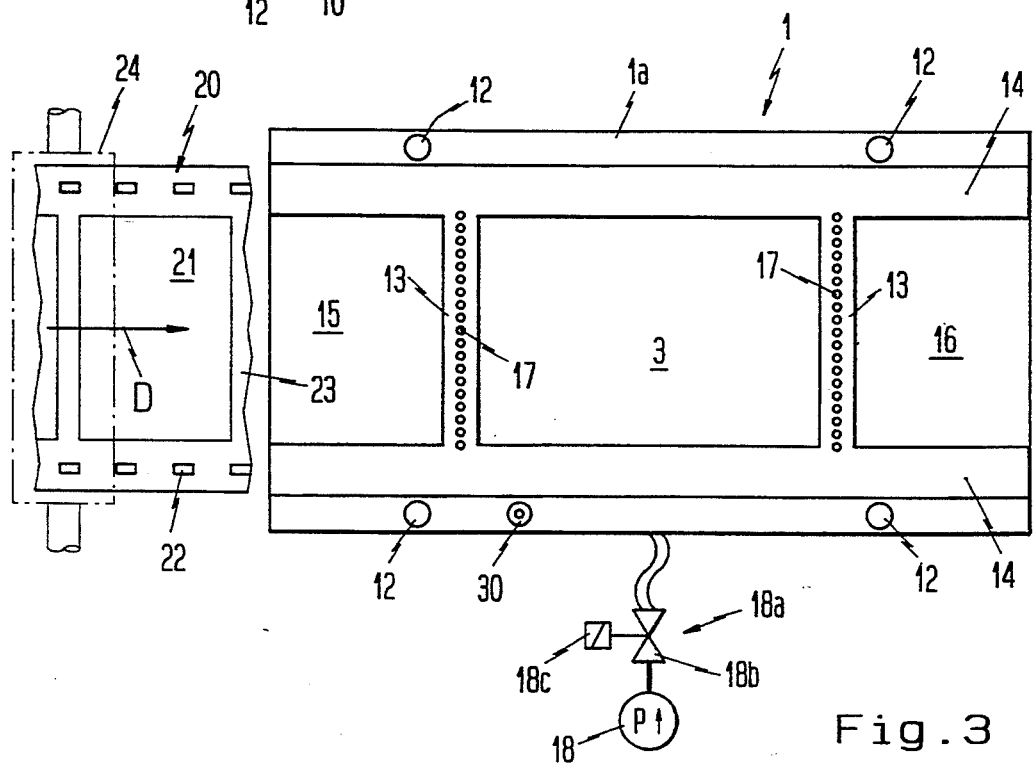
FIG. 3 is a plan view substantially as seen in the direction of arrows from the line III—III in FIG. 1, further showing a web of photographic material and means for advancing the web through the improved apparatus.

The means for moving the upper guide member 2 between the positions of FIGS. 1 and 2 comprises the springs 10 of the aforediscussed coupling units as well as one or more magnets 25 which can repel the guide member 2 against the opposition of the springs 10, e.g., in response to lowering toward the guide member 1 by one or more rotary cams 26 or in any other suitable way. The illustrated magnet 25 can be replaced by an electromagnet which is energized or deenergized when necessary in order to enable the springs 10 to lift the guide member 2 to the raised position of FIG. 2 in which the width of the clearance 19 assumes a maximum value. At such time, a sprocket wheel 24 (indicated in FIG. 3 by phantom lines) cooperates with the perforations 22 in marginal portions of the film 20 to advance the film in the direction of arrow D so as to place the next frame 21 into register with the windows 3 and 4.

When the control unit 18a enables the pump 18 to admit compressed air into the upper and lower ports 17, jets of compressed air issuing from such ports cause the adjacent portion of the film 20 to "float" between the surfaces 1a, 2a, i.e., the film is held out of contact with the guide members 1, 2 to thus ensure that its emulsion or any other sensitive part cannot be damaged during transport by the sprocket wheel 24. At such time, the width of the clearance 19 is increased to a maximum value (FIG. 2) by the springs 10 of the four coupling units.

Once the advancement of the film 20 by a step is completed, i.e., when a fresh film frame 21 is in accurate register with the windows 3, 4 and with the light duct 6, the cam 26 causes the magnet 25 to descend and thus induce the upper guide member 2 to move to the lower end position of FIG. 1 in which the portion 13, 14 of the lower surface 1a cooperates with the portion 13, 14 of the upper surface 2a to clamp the film 20 all the way around the film frame 21 at the copying station. If the control unit 18a is omitted, or if this control unit is permitted to connect the ports 17 with the outlet of the pump 18 in each position of the upper guide member 2a relative to the lower guide member 1a, the outlets of the ports 17 are automatically sealed by the guide members 1, 2 as soon as the guide member 2 descends to the clamping or locking position of FIG. 1. The portion 13, 14 of the upper surface 2a then cooperates with the portion 13, 14 of the lower surface 1a to reliably maintain that film frame 21 which registers with the windows 3, 4 in a predetermined plane best suited to ensure the making of a satisfactory image of such film frame.

The magnet 25 enables the springs 10 to dissipate some energy and lift the upper guide member 2 to the raised position of FIG. 2 as soon as the imaging of the frame 21 at the copying station is completed. The heads 11 of the fasteners which form part of the four coupling units limit the extent of upward movability of the guide member 2. The weight of the film portion between the guide members 1, 2 is less than the force of jets of compressed air which begin to issue from the upper and lower ports 17 as soon as the upper guide member 2 is lifted to the position of FIG. 2 so that the jets of compressed air again cause the film to float between the surfaces 1a, 2a and the film is ready to be advanced by a step without any damage to its upper and lower sides. It has been found that the improved apparatus can advance a film, or any other web of photosensitive material, through the copying station without causing any damage to the emulsion side or to the other side of the film in spite of the fact that, when the upper guide member 2 is lowered to the position of FIG. 1, the frame 21 which registers with the windows 3, 4 is mechanically engaged (by the portions 13, 14 of the surfaces 1a and 2a) at all four sides for the duration of the imaging step.

Another important advantage of the improved apparatus is that the lower guide member 1 can remain affixed to the base plate 5 and/or to another stationary part of the copying machine at all times. This is of particular importance in the aforediscussed minilabs wherein the lower guide member would have little room for movements in directions which are indicated by the arrows A and B. Moreover, the improved apparatus is simpler than heretofore known apparatus because it need not embody a relatively complex, bulky and expensive mechanism for moving the lower guide member in synchronism with the upper guide member.

A further advantage of the improved apparatus is that only the relatively small portions (13, 14) of each of the two surfaces 1a, 2a can come into actual contact with the respective sides of the film 20. This greatly reduces the likelihood of damage to (e.g., scratching of) the film during intermittent transport in the direction of arrow D. All that counts is to ensure that the sections 13 of the surfaces 1a, 2a (i.e., the sections which extend transversely of the elongated path for the film 20) are reliably disengaged from the film when the upper guide member 2 is lifted to the position of FIG. 2 and the ports 17 discharge jets of compressed air. This is important because, in the absence of such manipulation of the guide member 2, and in the absence of jets of compressed air from the outlets of the ports 17 when the guide member 2 is lifted, the sections 13 would be most likely to cause damage to the film 20 when the film is set in motion to advance in the direction of arrow D.

It is equally within the purview of the invention to provide ports 17 in only one of the two guide members 1, 2. Thus, one should ensure that the more sensitive side of the film 20 is maintained out of contact with the guide member 1 or 2 while the sprocket 24 (and/or any other suitable transporting means) is in operation to advance the film 20 along its path in a sense to locate the next, or a selected following, film frame 21 in a position of accurate alignment with the windows 3 and 4 and hence with the radiation source and with the light duct 6 of the copying machine. It is presently preferred to provide ports 17 in each of the two guide members so as to cause the film to levitate between the surfaces 1a and 2a during transport between the guide members. It is further preferred to cause the film to float substantially midway between the surfaces 1a and 2a when the imaging of a film frame 21 is completed. If the ports 17 are continuously connected with the outlet of the pump 18, movement of the film between the guide members 1, 2 to a level substantially midway between the portions 13, 14 of the two surfaces 1a, 2a takes place in automatic response to lifting of the magnet 25, i.e., in automatic response to lifting of the upper guide member 2 to the uppermost position of FIG. 2.

The control unit 18a can be operated in such a way that it disconnects the outlet of the pump 18 from the ports 17 as soon as the transport of the film 20 by a step is completed. This ensures that the film portion between the guide members 1, 2 descends onto the surface 1a as soon as a fresh film frame 21 is accurately aligned with the windows 3 and 4. The next step involves stressing of the springs 10 so that the guide member 2 descends and the film between such guide members is clamped by the portions 13, 14 of the two surfaces 1a and 2a. The machine is then ready to carry out a copying operation which is followed by renewed lifting of the guide member 2, admission of compressed air to the ports 17 and advancement of the film in the direction of arrow D.

The control unit 18a constitutes an optional feature of the improved apparatus. If this control unit is omitted, the pump 18 is set in operation as soon as the copying of a film frame is completed, or the pump 18 remains in operation at all times. In such apparatus, and as already described hereinabove, the ports 17 are sealed by the adjacent surfaces 1a, 2a when the upper guide member 2 is maintained in the position of FIG. 1.

The illustrated control unit 18a comprises a pneumatic valve 18b and a solenoid 18c. The solenoid 18c is energized or deenergized by a switch 30 which is mounted on one of the frame members 1, 2 and is actuated by the other frame member when the frame member 2 descends to the position of FIG. 1. This causes the solenoid 18c to close the valve 18b of the control unit 18a so that the ports 17 are sealed from the pump 18. The valve 18b is a commercially available solenoid-operated valve. This valve opens in automatic response to lifting of the frame member 2 above the position of FIG. 1.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. Apparatus for guiding and locating webs of photographic material which are advanced in a predetermined direction, comprising overlapping first and second guide members having confronting first and second surfaces defining a path for webs of photographic material, said guide members having registering windows and said surfaces having portions surrounding the respective windows, at least one of said portions having gas discharging ports with outlets facing the other of said portions; means for moving one of said guide members relative to the other of said guide members to and from a position in which a web in said path is clamped between said surfaces; and means for admitting a gaseous fluid into said ports, at least while said one guide member is out of said position, at least one of said guide members including a plate.

2. Apparatus for guiding and locating webs of photographic material which are advanced in a predetermined direction, comprising overlapping first and second guide members having confronting first and second surfaces defining a path for webs of photographic material, said guide members having registering windows and said surfaces having portions surrounding the respective windows, at least one of said portions having gas discharging ports with outlets facing the other of said portions; means for moving one of said guide members relative to the other of said guide members to and from a position in which a web in said path is clamped between said surfaces; and means for admitting a gaseous fluid into said ports, at least while said one guide member is out of said position, said at least one portion including at least one section extending substantially transversely of said path, said ports being provided in said at least one section.

3. Apparatus for guiding and locating webs of photographic material which are advanced in a predetermined direction, comprising overlapping first and second guide members having confronting first and second surfaces defining a path for webs of photographic material, said guide members having registering windows and said surfaces having portions surrounding the respective windows, at least one of said portions having gas discharging ports with outlets facing the other of said portions, at least one of said surfaces having at least one recessed zone adjacent said portion of said at least one surface; means for moving one of said guide members relative to the other of said guide members to and from a position in which a web in said path is clamped between said surfaces; and means for admitting a gaseous fluid into said ports, at least while said one guide member is out of said position.

4. The apparatus of claim 3, wherein the guide member having said at least one surface has a platform which surrounds the respective window, said portion of said at least one surface being provided on said platform.

5. Apparatus for guiding and locating webs of photographic material which are advanced in a predetermined direction, comprising overlapping first and second guide members having confronting first and second surfaces defining a path for webs of photographic material, said guide members having registering windows and said surfaces having portions surrounding the respective windows, each of said portions having gas discharging ports, the ports of said portion of said first surface having outlets facing said second surface and the ports in said portion of said second surface having outlets facing said first surface; means for moving one of said guide members relative to the other of said guide members to and from a position in which a web in said path is clamped between said surfaces; and means for admitting a gaseous fluid into said ports, at least while said one guide member is out of said position.

6. Apparatus for guiding and locating webs of photographic material which are advanced in a predetermined direction, comprising overlapping first and second guide members having confronting first and second surfaces define a path for webs of photographic material, said guide members having registering windows and said surfaces having portions surrounding the respective windows, at least one of said portions having gas discharging ports with outlets facing the other of said portions, said one guide member being located at a level above said other guide member; means for moving one of said guide members relative to the other of said guide members to and from a position in which a web in said path is clamped between said surfaces; and means for admitting a gaseous fluid into said ports, at least while said one guide member is out of said positions.

7. Apparatus for guiding and locating webs of photographic material which are advanced in a predetermined direction, comprising overlapping first and second guide members having confronting first and second surfaces defining a path for webs of photographic material, said guide members having registering windows and said surfaces having portions surrounding the respective windows, at least one of said portions having gas discharging ports with outlets facing the other of said portions; means for moving one of said guide members relative to the other of said guide members to and from a position in which a web in said path is clamped between said surfaces; and means for admitting a gaseous fluid into said ports, at least while said one guide member is out of said position, said admitting means including means for admitting a gaseous fluid into said ports in each position of said one guide member.

8. The apparatus of claim 7, wherein said admitting means includes a continuously driven pump.

9. Apparatus for guiding and locating webs of photographic material which are advanced in a predetermined direction, comprising overlapping first and second guide members having confronting first and second surfaces defining a path for webs of photographic material, said guide members having registering windows and said surfaces having portions surrounding the respective windows, at least one of said portions having gas discharging ports with outlets facing the other of said portions; means for moving one of said guide members relative to the other of said guide members to and from a position in which a web in said path is clamped between said surfaces; and means for admitting a gaseous fluid into said ports, at least while said one guide member is out of said position, said admitting means comprising an air compressor and control means for connecting said compressor with said ports only while said one guide member is out of said position.

10. The apparatus of claim 9, further comprising means for advancing a web in said direction when said one guide member is out of said position.

11. Apparatus for guiding and locating webs of photographic material which are advanced in a predetermined direction, comprising overlapping first and second guide members having confronting first and second surfaces defining a path for webs of photographic material, said guide members having registering windows and said surfaces having portions surrounding the respective windows, at last one of said portions having gas discharging portions with outlets facing the other of said portions; means for moving one of said guide members relative to the other of said guide members to and from a position in which a web in said path is clamped between said surfaces, said moving means comprising a magnet; and means for admitting a gaseous fluid into said ports, at least while said one guide member is out of said position.

* * * * *

UNITED STATES PATENT AND TRADEMARK OFFICE
CERTIFICATE OF CORRECTION

PATENT NO. : 5,404,195
DATED : April 4, 1995
INVENTOR(S) : Erich NAGEL

It is certified that error appears in the above-indentified patent and that said Letters Patent is hereby corrected as shown below:

Title page, [73], Assignee, change "Agfa-Gebaert Aktiengesellschaft" to --Agfa-Gevaert Aktiengesellschaft--.

Signed and Sealed this

Twentieth Day of June, 1995

Attest:

Attesting Officer

BRUCE LEHMAN

Commissioner of Patents and Trademarks